United States Patent [19]

Ohsaka et al.

[11] Patent Number: 4,973,742

[45] Date of Patent: Nov. 27, 1990

[54] HALOGEN-CONTAINING POLYETHER

[75] Inventors: Yohnosuke Ohsaka; Takashi Tohzuka; Shoji Takaki, all of Osaka, Japan

[73] Assignee: Daikin Industries Ltd., Osaka, Japan

[21] Appl. No.: 338,036

[22] Filed: Apr. 14, 1989

Related U.S. Application Data

[60] Division of Ser. No. 940,191, Dec. 9, 1986, Pat. No. 4,845,268, which is a continuation of Ser. No. 684,345, Dec. 20, 1984, abandoned.

[30] Foreign Application Priority Data

Dec. 26, 1983 [JP] Japan ................................. 58-251069
Mar. 26, 1984 [JP] Japan ................................. 59-058877
Nov. 7, 1984 [JP] Japan ................................. 59-235610

[51] Int. Cl.$^5$ ............................................. C07C 69/66
[52] U.S. Cl. ..................................... 560/184; 560/179
[58] Field of Search ................................. 560/184, 179

[56] References Cited

U.S. PATENT DOCUMENTS 4,845,268 7/1989 Ohsaka et al. ....................... 560/184

Primary Examiner—John Kight, III
Assistant Examiner—P. Hampton-Hightower
Attorney, Agent, or Firm—Birch, Stewart, Kolasch & Birch

[57] ABSTRACT

A halogen-containing polyether comprising repeating units of the formula:

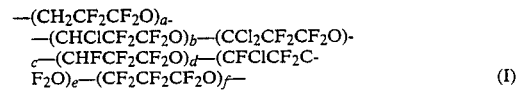

wherein a, b, c, d, e and f are each an integer not less than 0 and satisfy the following equations:

$$2 \leq a+b+c+d+e+f \leq 200$$

and

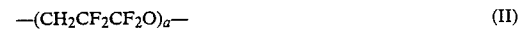

$$1 \leq a+c+d+f,$$

which may be prepared by ring-opening polymerizing 2,2,3,3-tetrafluorooxetane in the presence of a polymerization initiator to give a polyether comprising repeating units of the formula:

$$-(CH_2CF_2CF_2O)_a- \quad (II)$$

wherein a is the same as defined above, and optionally fluorinating and/or chlorinating the polyether (II).

27 Claims, 7 Drawing Sheets

HALOGEN-CONTAINING POLYETHER

This application is a divisional of copending application Ser. No. 940,191, filed on Dec. 9, 1986, now U.S. Pat. No. 4,845,268, which is a Dec. 20, 1984, now abandoned.

FIELD OF THE INVENTION

The present invention relates to a halogen-containing polyether. More particularly, it relates to a fluorine and/or chlorine containing polyether and a process for the production of the same.

SUMMARY OF THE INVENTION

One object of the invention is to provide a novel halogen-containing polyether.

Another object of the invention is to provide a novel halogen-containing straight polyether.

A further object of the invention is to provide a chemically and/or thermally stable halogen-containing polyether.

A still further object of the invention is to provide a process for the production of the novel halogencontaining polyether of the invention.

DETAILED DESCRIPTION OF THE INVENTION

A novel halogen-containing polyether of the invention comprises repeating units represented by the following formula:

$$-(CH_2CF_2CF_2O)_a-(CHClCF_2CF_2O)_b-(CCl_2CF_2CF_2O)_c-(CHFCF_2CF_2O)_d-(CFClCF_2CF_2O)_e-(CF_2CF_2CF_2O)_f- \quad (I)$$

wherein a, b, c, d, e and f are each an integer not less than 0 and satisfy the following equations:

$$2 < a+b+c+d+e+f < 200$$

and $$1 < a+c+d+f.$$

Typically, the halogen-containing polyether of the invention includes the following polyethers:

a fluorine-containing polyether comprising repeating units of the formula:

$$-(CH_2CF_2CF_2O)_a- \quad (II)$$

wherein a is the same as defined above, a fluorine-containing polyether comprising repeating units of the formula:

$$-(CH_2CF_2CF_2O)_a-(CHFCF_2CF_2O)_d-(CF_2CF_2CF_2O)_f- \quad (III)$$

wherein a, d and f satisfy the above requirements and the equation: $1 \leq d+f$, and a fluorine/chlorine-containing polyether comprising repeating units of the formula:

$$-(CH_2CF_2CF_2O)_a-(CHClCF_2CF_2O)_b-(CCl_2CF_2CF_2O)_c-(CHFCF_2CF_2O)_d-(CFClCF_2CF_2O)_e-(CF_2CF_2CF_2O)_f- \quad (IV)$$

wherein a, b, c, d, e and f satisfy the above requirements and the equation: $1 \leq b+c+e$.

In the formulas in the specification, the sequence of the repeating units may be random and is not necessarily the same as defined in the formulas.

The fluorine-containing polyether (II) can be prepared by ring-opening polymerization of 2,2,3,3-tetrafluorooxetane.

2,2,3,3-tetrafluorooxetane is a known compound and is prepared, for example, by reacting tetrafluoroethylene and paraform in anhydrous hydrogen fluoride.

Generally, the ring-opening polymerization is initiated by a polymerization initiator. Examples of the initiator are ones that generate an active halogenoanion in an aprotic solvent (eg. alkali metal halides) and one having strong Lewis acidity.

An amount of the initiator is not critical in the present invention. Preferably, it is from 0.001 to 30 % by mole, more preferably from 0.01 to 10 % by mole, based on the amount of 2,2,3,3-tetrafluorooxetane.

Specific examples of the alkali metal halides are potassium fluoride, potassium iodide, potassium bromide, cesium fluoride, etc. When the polimerization is initiated by the alkali metal halide, generally, a produced compound has the formula:

$$A-(CH_2CF_2CF_2O)_a-CH_2CF_2COF \quad (V)$$

wherein a is the same as defined above, and A is fluorine, bromine or iodine. The compound (V) having an acyl fluoride end group may be converted to a corresponding acid, salt with an alkali metal, ester or amide by a per se conventional method such as hydrolysis, esterification, etc.

When an acyl fluoride of the formula:

$$R_fCOF \quad (VI)$$

or $$R_f'O-(CFCF_2O)_p-CFCOF \atop \phantom{R_f'O-(}CF_3\phantom{CF_2O)_p-}CF_3 \quad (VII)$$

wherein $R_f$ is a perfluoroalkyl group having 1 to 10 carbon atoms, $R_f'$ is a perfluoroalkyl group having 1 to 10 carbon atoms or a group of the formula:

and p is an integer of 0 to 50 is added to the polymerization system in which the alkali metal fluoride is used as the initiator, produced is the compound (V) in which A is a group of the formula:

$$R_fCF_2O-\qquad\qquad(VIII)$$

or $$R_fO-(CFCF_2O)_{p+1}-\qquad(IX)$$
$$\phantom{R_fO-(}|\phantom{CFCF_2O)_{p+1}-}$$
$$\phantom{R_fO-(}CF_3$$

When acyl fluoride of the formula:

$$FCH_2CF_2COF\qquad\qquad(X)$$

is added to the reaction system in which cesium fluoride is used as the initiator, the same compound as obtained when alkali metal fluoride alone is used. This method is advantageous to produce a low molecular oligomer with controlling molecular weight distribution.

As understood from the above, a comparatively highly volatile low molecular weight compound contained in a high molecular weight product is recovered by distillation and added to the subsequent reaction as the initiator together with alkali metal fluoride.

Instead of using the acyl fluoride, a fluorine-containing epoxide is reacted with alkali metal fluoride to obtain an acyl fluoride, which is, in turn, reacted with 2,2,3,3-tetrafluorooxetane. For example, hexafluoropropylene oxide is reacted with cesium fluoride in the aprotic solvent to obtain a compound of the formula:

$$CF_3CF_2CF_2O-(CFCF_2O)_p-CFCOF\qquad(XI)$$
$$\phantom{CF_3CF_2CF_2O-(}|\phantom{CFCF_2O)_p-}|$$
$$\phantom{CF_3CF_2CF_2O-(}CF_3\phantom{CF_2O)_p-}CF_3$$

wherein p is an integer of 0 to 50. Then, 2,2,3,3-tetrafluorooxetane is added to the reaction mixture to obtain the same compound as obtained when the above acyl fluoride alone is used.

Alternatively, a compound of the formula:

$$A(CH_2CF_2CF_2O)_p(CFCF_2O)_qCFCOF\qquad(XII)$$
$$\phantom{A(CH_2CF_2CF_2O)_p(}|\phantom{CFCF_2O)_q}|$$
$$\phantom{A(CH_2CF_2CF_2O)_p(}CF_3\phantom{CF_2O)_q}CF_3$$

wherein A is the same as defined above, p is an integer of 2 to 200 and q is an integer of 0 to 50 is prepared by firstly ring-opening 2,2,3,3-tetrafluorooxetane in the presence of the alkali metal halide initiator or the initiator system of alkali metal fluoride and the acyl fluoride and then adding hexafluoropropylene oxide.

As understood from the above discussion, theoretically, the present invention can afford an alternative or block copolymer of 2,2,3,3-tetrafluorooxetane and an epoxide compound (eg. hexafluoropropylene oxide) which can be ring opening polymerized by the same initiator system. Further, when a bifunctional acyl fluoride (eg. oxalic fluoride) is used together with alkali metal fluoride to open 2,2,3,3-tetrafluorooxetane, a bifunctional compound of the formula:

FOCCF$_2$CH$_2$(OCF$_2$CF$_2$CH$_2$)$_p$OCF$_2$C-
F$_2$O(CH$_2$CF$_2$CF$_2$O)$_q$CH$_2$CF$_2$CF$_2$O)$_q$CH$_2$CF-
$_2$COF (XIII)

wherein p and q are each an integer of 0 to 200 is prepared

Generally, in the presence of alkali metal fluoride, any acyl fluoride that forms an equilibrium amount of fluoroalkoxy anion according the following equation $$-COF + MF \rightleftharpoons -CF_2O-M^+\qquad(XIV)$$

can act as an initiator for ring opening polymerization of 2,2,3,3-tetrafluorooxetane and forms an end group of the formula:

$$-CF_2O-\qquad\qquad(XV)$$

A preferred example of the Lewis acidic initiator is antimony pentafluoride.

The reaction of the invention is usually carried out in a liquid reaction medium. When the initiator other than the Lewis acidic one is used, an aprotic solvent such as polyethylene glycol dimethyl ether (eg. diglyme, triglyme, tetraglyme, etc.) is preferably used. In acetonitrile or glyme (CH$_3$OCH$_2$CH$_2$OCH), the reaction of the invention hardly or does not proceed, but a small amount of a large cyclic polyether such as 18-crown ether-6 accelerates the reaction in these solvents Acetonitrile and glyme are preferred since they have low boiling points and are easily removed from the reaction mixture by distillation.

When the Lewis acidic initiator is used, a solvent is not necessarily used. Sometimes, a dimer or trimer of hexafluoropropylene is used.

The reaction temperature varies with the kinds of the initiator and/or the solvent. Usually, it is −30 to 100° C., preferably −30° to +50° C.

The product is recovered from the reaction mixture by a per se conventional method. The solid product is recovered, for example, by washing the reaction mixture with water to remove the solvent and initiator and filtering it. The volatile product is recovered, for example, by rectification.

The reaction product has a structure of the formula (V) with the acyl fluoride end group having high reactivity, and is per se useful. In some instances, a chemically inactive compound is required. For example, when the acyl fluoride (V) is heated in the dimer or trimer of hexafluoropropylene in the presence of antimony pentafluoride as a catalyst, a compound of the formula:

$$X(CH_2CF_2CF_2O)_nCH_2CF_3\qquad(XVI)$$

is obtained.

The fluorine-containing polyether comprising the repeating units of the formula:

—(CH$_2$CF$_2$CF$_2$O)$_a$—(CHFCF$_2$CF$_2$O)-
$_d$—(CF$_2$CF$_2$CF$_2$O)$_f$— (III)

wherein a, d and f satisfy the above requirements and the equation: 1 <d+f is prepared by fluorinating the polyether (II).

Fluorination is carried out by reacting fluorine gas with the polyether (II) at a temperature of from 160° to 300° C., preferably from 180° to 250° C. Fluorination may be carried out at a temperature lower than the above temperature range. At such low temperature, the fluorination is accelerated by ultraviolet radiation. In the latter reaction, hydrogen fluoride is inevitably produced. Therefore, the light source must be protected by a material which is resistant to hydrogen fluoride and transmits light having a wavelength of from 200 to 400 nm, preferably from 300 to 400 nm. Thus, the fluorination with ultraviolet radiation cannot be carried out in a reactor having a window made of glass (eg. quartz glass) which is usually used for photoreaction, since glass is corroded by hydrogen fluoride.

A light-transmitting material to be used in the fluorination of the invention is single crystal sapphire or a melt moldable transparent fluorine-containing polymer. Specific examples of such fluorine-containing polymer are tetrafluoroethylene/hexafluoropropylene copolymers, tetrafluoroethylene/perfluoropropyl vinyl ether copolymers, tetrafluoroethylene/ethylene copolymers, polychlorotrifluoroethylene and polyvinylidene fluoride.

Since single crystal sapphire is expensive and one having a large area is hardly obtainable, the fluorine-containing polymer is commercially preferred.

When the reactor is radiated by ultraviolet light from the reactor interior, a transparent glass part is covered with the fluorine-containing polymer. When the reactor is radiated by an outside light source, the transparent window is made of the fluorine-containing polymer film. To make the window pressure-resistant, the film is laminated on a plate made of glass, for example, quartz glass.

The reaction system may be radiated directly or through a gas phase.

Usually, ultraviolet light has a wavelength of from 200 to 400 nm, preferably from 250 to 350 nm.

When the fluorination is carried out with ultraviolet radiation, the reaction temperature is not critical. However, the reaction system is heated to a temperature at which the system is stirred to smoothly promote the fluorination. Thus, the reaction temperature mainly depends on the molecular weight of the polyether (II). Generally, as the fluorination proceeds, flow point and viscosity of the product decrease and correspondingly the reaction temperature can be lowered Practically, the reaction temperature is from 0° to 120° C., preferably from a room temperature to 100° C.

Fluorination may be carried out by bubbling the fluorine gas in the reaction system or by injecting the gas in the gas phase. The fluorine gas may be diluted with an inactive gas (eg. carbon dioxide, nitrogen, etc.).

The fluorination can be carried out continuously or batchwise.

When the polyether (II) having an end group of the formula:

—OCH$_2$CF$_2$COF or —OCH$_2$CF$_2$COOH  (XVII)

is fluorinated with ultraviolet radiation, and almost all hydrogen atoms are substituted by fluorine atoms, a mixture of a compound having an end group of the formula: —OCF$_2$CF$_2$COF and one having an end group of the formula: —OCF$_2$CF$_3$ is obtained. After terminating the introduction of fluorine gas, the interior of the reactor is replaced with nitrogen and further radiated with ultraviolet light, the former end group is converted to the latter. Thus, by the fluorination of the polyether (II) with ultraviolet radiation, the polyether (III) having a stable end group is produced even if the polyether (II) has an unstable end group.

A completely fluorinated polyether comprising repeating units of the formula:

—CF$_2$CF$_2$CF$_2$O— is produced by thoroughly fluorinating the polyether (II). When the polymer (II) is not completely fluorinated, a mixture of a completely fluorinated one and a partly fluorinated one is produced.

It is difficult to isolate the completely fluorinated polyether from such mixture by conventional distillation. However, the completely fluorinated polyether is separated from the partly fluorinated one with a polar solvent such as acetone. When the above mixture is dissolved in the polar solvent, the completely fluorinated polyether is contained in the lower layer and easily recovered by liquid-liquid separation.

The fluorine/chlorine-containing polyether comprising the repeating units of the formula:

—(CH$_2$CF$_2$CF$_2$O)$_a$—(CHClCF$_2$CF$_2$O)$_b$—(CCl$_2$CF$_2$CF$_2$O)$_c$—(CHFCF$_2$CF$_2$O)$_d$—(CFClCF$_2$CF$_2$O)$_e$—(CF$_2$CF$_2$CF$_2$O)$_f$—  (IV)

wherein a, b, c, d, e and f are the same as defined above is prepared by fluorinating and chlorinating the polyether (II) or chlorinating the polyether (III).

Fluorination is carried out in the same manner as described above.

Chlorination is carried out by reacting chlorine gas with the polyether (II) or (III) with radiation of ultraviolet light having a wavelength of from 200 to 500 nm. The reaction temperature varies with the molecular weight of the polyether to be chlorinated and is kept at a temperature at which the reaction system can be stirred. Generally, as chlorination proceeds, the viscosity of the reaction system decreases and correspondingly the reaction temperature is lowered. Usually, the reaction temperature is from 30° to 200° C., preferably from 50° to 150° C.

Chlorination may be carried out by bubbling the chlorine gas in the reaction system or by injecting the gas in the gas phase. The chlorine gas may be diluted with an inactive gas (eg. argon, nitrogen, etc.).

Any reactor that is radiated by an inside or outside light source may be used for chlorination. As a transparent material, quartz or Pyrex glass are preferred.

Chlorination of the polyether (II) affords a halogen-containing polyether comprising the repeating units of the formula:

—(CH$_2$CF$_2$CF$_2$O)$_a$—(CHClCF$_2$CF$_2$O)$_b$—(CCl$_2$CF$_2$CF$_2$O)$_c$—  (XVIII)

wherein a, b and c are the same as defined above.

The polyether (IV) is produced by fluorinating the polyether (XVIII).

Alternatively, the polyether (II) is firstly fluorinated to produce the polyether (III) and then chlorinated to produce the polyether (IV).

The main chain of the polyether of the invention is chemically thermally stable and used in the same applications as conventional fluororesins and perfluoropolyether. For example, the polyether having the acyl fluoride end group is useful as an intermediate for the production of various fluorine-containing compounds. Those having a carboxyl end group are useful, for example, as surfactants. Those having a stabilized end group are heat and chemical resistant oils and thus useful as heat transfer medium, lubricant, plasticizer, modifier, etc. Those having a large molecular weight are used as molding materials.

The present invention will be hereinafter explained further in detail by the following Examples.

EXAMPLE 1

In a 200 ml glass tube equipped with a rotor flow valve, 50 ml of dry diglyme, 0.15 g of cesium fluoride and 50 g of 2,2,3,3-tetrafluorooxetane were charged and stirred at a room temperature for 15 hours The reaction mixture was poured in 1,000 ml of water. A precipitated solid material was filtered off, washed with methanol and dried under a reduced pressure to obtain 45 g of white powder. M.P., 78° C. Decomposing temperature, 316° C.

| Elemental analysis: | C | H | F |
|---|---|---|---|
| Calc'd: | 27.6 | 1.51 | 58.0 |
| Found: | 27.7 | 1.55 | 58.4 |

NMR: $\delta$(ppm)=4.62 ($CH_2$) (Internal standard=TMS)

$\delta$(ppm)= −7.2 (−$CF_{-2}O$—), −41.4 (—$CH_2CF_{-2}$-)

(External standard=TFA, The magnetic field lower than the standard is plus)

Figure 1:
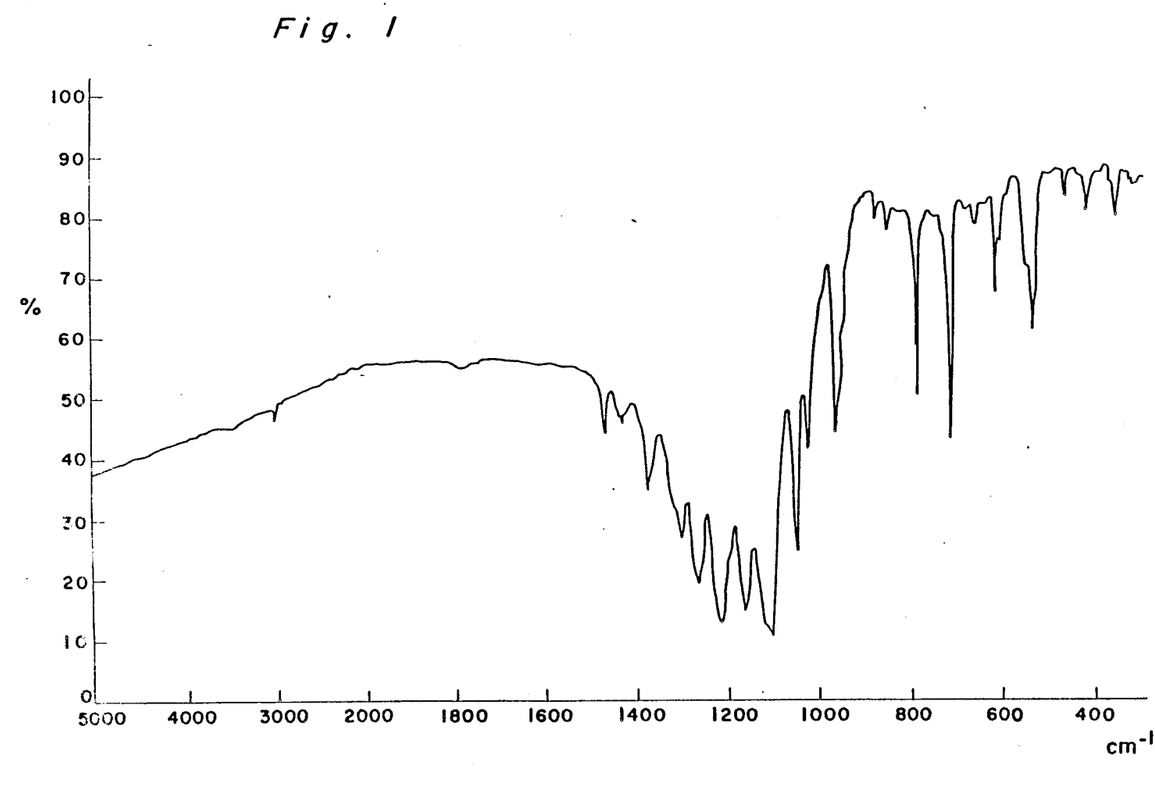
FIG. 1 is an IR spectrum of the compound obtained in Example 1.

IR spectrum of the product is shown in FIG. 1.

From the above results, the obtained product was identified as the compound having the repeating units of the formula: —$CH_2CF_2CF_2O$—.

An average molecular weight of the compound was $1.5 \times 10^4$ from GPC.

EXAMPLE 2

A 1 liter flask equipped with a dry ice condenser and a dropping funnel was thoroughly replaced with dry nitrogen gas. Then, in the flask, 200 ml of dry diglyme and 4.2 g of cesium fluoride were charged. On an ice bath, 166 g of perfluoro-2-propoxypropionyl fluoride was added with stirring and kept standing for 30 minutes. Thereafter, 650 g of 2,2,3,3-tetrafluorooxetane was dropwise added over 5 hours. The ice bath was replaced with a water bath kept at 25° C. and the reaction mixture was kept standing on it for 25 hours. The thus obtained homogeneous liquid was distilled under a reduced pressure to obtain 725 g of the liquid product at 60°-200° C./1 mmHg.

By GC/MS, NMR and IR analyses, the product was identified as a mixture of the compounds of the formula:

wherein p is an integer of 1 to 10.

EXAMPLE 3

A 300 ml flask equipped with a dry ice condenser and a dropping funnel was thoroughly replaced with dry nitrogen gas. Then, 50 ml of dry diglyme and 0.2 g of cesium fluoride were charged. On an ice bath, 26.0 g of 2,2,3-trifluoropropionyl fluoride was added with stirring and kept standing for 30 minutes. Thereafter, 130 g of 2,2,3,3-tetrafluorooxetane was dropwise added over 3 hours. The ice bath was replaced with a water bath and the reaction mixture was kept standing on it for 12 hours. 30 g of methanol was dropwise added to the reaction mixture and kept standing for 30 minutes. Then, the reaction mixture was poured in 2 liters of water, thoroughly stirred and separated with a separatory funnel. The lower layer (150 g) was recovered.

The product was identified as a mixture of the compounds of the formula:

wherein q is an integer of 0 to 9.

EXAMPLE 4

In the same flask as used in Example 3, 150 g of hexafluoropropylene dimer (a mixture of 30 parts by weight of $(CF_3)_2CFCF=CFCF_3$ and 70 parts by weight of $(CF_3)_2C=CFCF_2CF_3$) and 0.3 g of antimony pentafluoride were charged. Then, 65 g of 2,2,3,3-tetrafluorooxetane was dropwise added with stirring and kept standing at a temperature of from −50° to 0° C. for 5 hours. Fractions having low boiling points were recovered by distillation under a reduced pressure to obtain 50 g of the waxy product. M.P., 52° C.

The product was identified as the compound having repeating units of the formula: -$CH_2CF_2CF_2O$—.

EXAMPLE 5

In a 500 ml glass flask, 100 ml of dry diglyme and 1.0 g of potassium fluoride were charged and, on an ice bath, 130 g of 2,2,3,3-tetrafluorooxetane was dropwise added with stirring and kept standing for 15 hours. The reaction mixture was, then, post treated in the same manner as in Example 1 to obtain 120 g of the polymeric compound, which was identified as the compound having the repeating units of the formula: —$CH_2CF_2CF_2O$- and a molecular weight of $1.0 \times 10^4$ from GPC.

EXAMPLE 6

In the same flask as used in Example 3, 50 ml of dry diglyme and 15 g of potassium iodide were charged. Then, 32.5 g of 2,2,3,3-tetrafluorooxetane was dropwise added and kept standing for 24 hours. Thereafter, 10 g of methanol was added and kept standing for 30 minutes. The reaction mixture was washed with water to obtain the oily product, which was identified as a mixture of the compounds of the formula:

wherein r is an integer of from 0 to 5.

EXAMPLE 7

In a 200 ml flask equipped with a dry ice condenser, 50 ml of triglyme, 100 g of 2,2,3,3-tetrafluorooxetane and 0.3 g of trimethylamine were charged and stirred for 20 hours on a water bath. Then, the obtained oily product was washed with water and dried by an evaporator to obtain 83 g of the waxy polymer. M.P., 60° C.

By IR and NMR analyses, the polymer was identified as one having repeating units of the formula: —$CH_2CF_2CF_2O$—.

EXAMPLE 8

In a 100 ml flask equipped with a dry ice condenser and a dropping funnel, 30 ml of dry diglyme and 1.2 g of cesium fluoride were charged and stirred on a bath kept at −30° C. Then, 10 g of gaseous perfluoropropionyl fluoride was injected and kept standing for 30 minutes. Thereafter, the temperature of the bath was raised to 0° C., and 50 g of 2,2,3,3-tetrafluorooxetane was dropwise added over 20 hours. Then, the temperature of the bath was gradually raised to 20° C. The reaction mixture was stirred at the same temperature for 5 hours, poured in 50 ml of methanol, stirred and washed with a large amount of water to obtain 47 g of the oily product.

By GC/MS, NMR and IR analyses, the product was identified as a mixture of the compounds of the formula $$C_3F_7O(CH_2CF_2CF_2O)_nCH_2CF_2COOCH_3$$

wherein n is an integer of 1 to 8.

EXAMPLE 9

In a 30 ml flask equipped with a dry ice condenser and a dropping funnel, 10 ml of dry diglyme, 1.2 g of cesium fluoride and 2.0 g of 2,2,3-trifluoropropionyl fluoride were charged and stirred on a water bath for 1 hour. Then, 10 g of 2,2,3,3-tetrafluorooxetane was dropwise added over 3 hours. The water bath was replaced with an ice bath and hexafluoropropylene oxide was injected at a rate of 10 ml/min. for 2 hours. Thereafter, the reaction was further continued for 5 hours. The reaction mixture was treated with methanol and washed with water to obtain 18 g of the oily product, which was identified as a mixture of the compounds of the formula:

$$F(CH_2CF_2CF_2O)_m(\underset{\underset{CF_3}{|}}{C}FCF_2O)_n\underset{\underset{CF_3}{|}}{C}FCOOCH_3$$

wherein m is an integer of 2 to 9 and n is an integer of 0 to 3.

EXAMPLE 10

In the same manner as in Example 8 but using 10 g of perfluoroacetone in place of perfluoropropionyl fluoride and 2,2,3,3-tetrafluorooxetane in an amount of 50 g, the reaction was carried out to obtain 53 g of the oily product, which was identified as a mixture of the compounds of the formula:

$$(CF_3)_2CFO(CH_2CF_2CF_2O)_nCH_2CF_2COOCH_3$$

wherein n is an integer of 1 to 8.

EXAMPLE 11

50 g of the compound obtained in Example 2 was added to a mixture of 10 ml of hexafluoropropylene dimer and 1.2 g of antimony pentafluoride and heated at 50° C. for 1 hours. During the reaction, the gas phase was monitored by IR analysis to find that absorption at 1,890 cm,$^{-1}$ which is characteristic absorption by the —COF group, disappeared. The reaction mixture was washed with hydrochloric acid, an alkaline solution and water, dried and then distilled under a reduced pressure to obtain 43.8 g of the liquid product at 100°–200° C./1 mmHg.

The product was identified as a mixture of the compounds of the formula:

$$C_3F_7O\underset{\underset{CF_3}{|}}{C}FCF_2O(CH_2CF_2CF_2O)_pCH_2CF_3$$

wherein p is an integer of 1 to 10.

EXAMPLE 12

In a 100 ml steel made reactor, 3.00 g of white powdery fluorine-containing polyether of the formula:

$$F(CH_2CF_2CF_2O)_nCH_2CF_2COOH$$

wherein the average of n is 25 was charged and gradually heated from 140° C. to 200° C. with stirring on an oil bath. A gaseous mixture of fluorine and nitrogen in a volume ratio of 20 to 80 was injected in the reactor at a flow rate of 100 ml/min. for 3 hours. After cooling and replacing the reactor interior with nitrogen, 2.05 g of the viscous product was obtained.

By IR and NMR analyses, the product was identified as a mixture of the compounds having repeating units of the formula:

$$-(CH_2CF_2CF_2O)_p-(CHFCF_2CF_2O)_q-$$

wherein the ratio of p to q is 7 to 3.

EXAMPLE 13

In the same manner as in Example 12 but charging 5.20 g of the fluorine containing polyether and injecting the gaseous mixture of fluorine and nitrogen for 4.5 hours, the fluorination was carried out to obtain 2.48 g of the liquid product, which was identified as a mixture of the compounds having repeating units of the formula:

$$-(CF_2CF_2CF_2O)_r-(CHFCF_2CF_2O)_q$$

wherein the ratio of r to q is 5 to 1.

EXAMPLE 14

In a photoreactor having an optically transparent window made of tetrafluoroethylene/perfluoroalkyl vinyl ether copolymer (hereinafter referred to as "PFA"), 4.9 g of poly(2,2,3,3-tetrafluorooxetane) of the formula:

$$F(CH_2CF_2CF_2O)_nCH_2CF_2COOH$$

wherein the average of n is 24 was charged and heated at 100° C. on an oil bath in a nitrogen stream.

Then, the polymer was radiated by a high pressure mercury lamp (wavelength: 312.5–577 nm) from a distance of 10 cm with stirring in a stream of a gaseous mixture of fluorine and nitrogen in a volume ratio of 20 to 80 at a flow rate of 50 ml/min.

After 15 hours, the flow of the gaseous mixture was terminated, and then nitrogen was injected in the reactor at a flow rate of 50 ml/min for 12 hours with radiating by the mercury lamp. After cooling, 5.90 g of the oily product was obtained. Flow point, −55° C.

| Elemental analysis: | C | H | F |
|---|---|---|---|
| Calc'd: | 21.7 | 0.01 | 68.7 |
| Found: | 21.5 | 0 | 69.1 |

Figure 2:
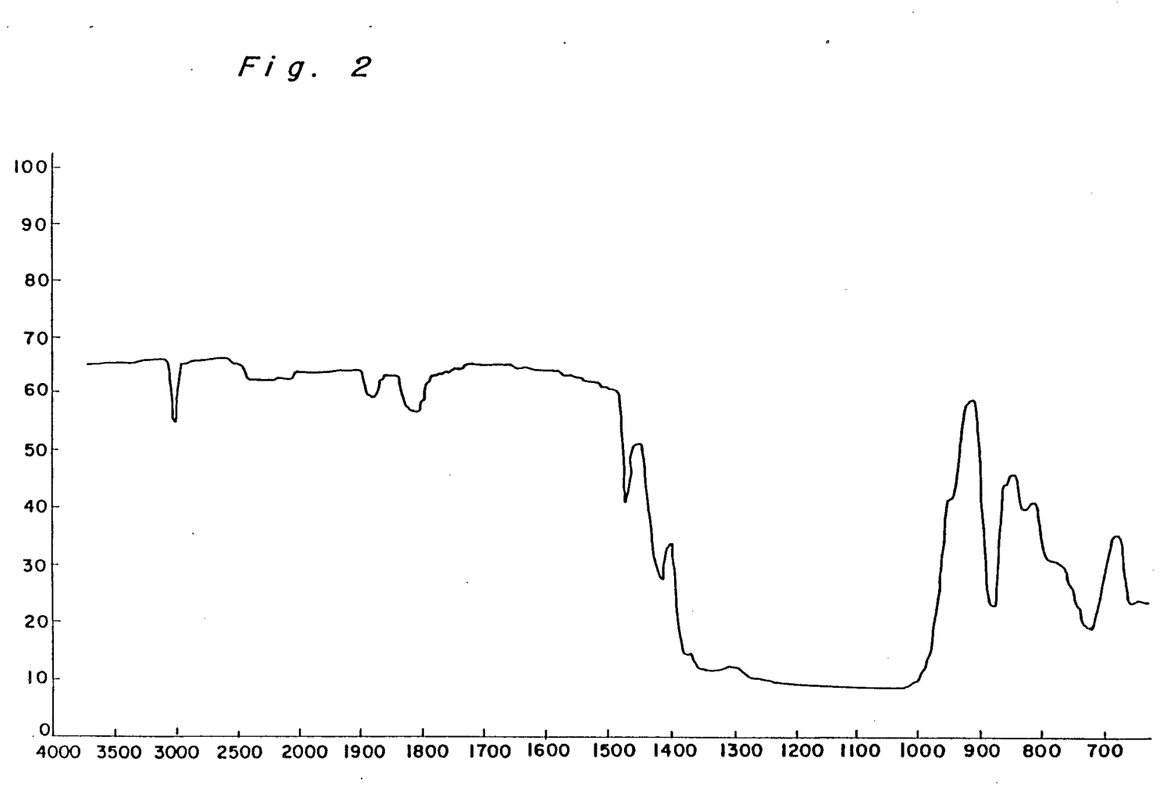
FIGS. 2 to 4 show the change of IR spectrum with passage of time during the reaction in Example 14.
Figure 3:
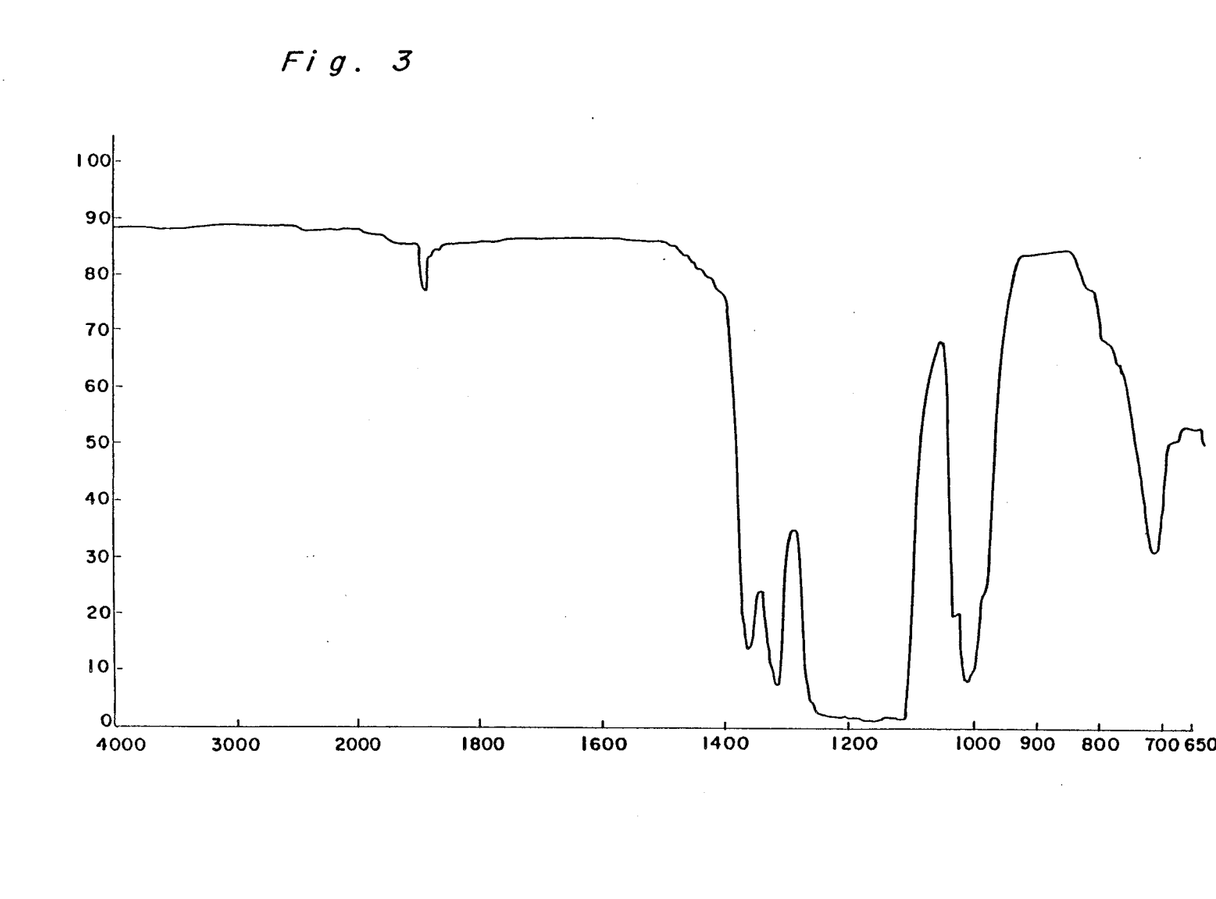
Figure 4:
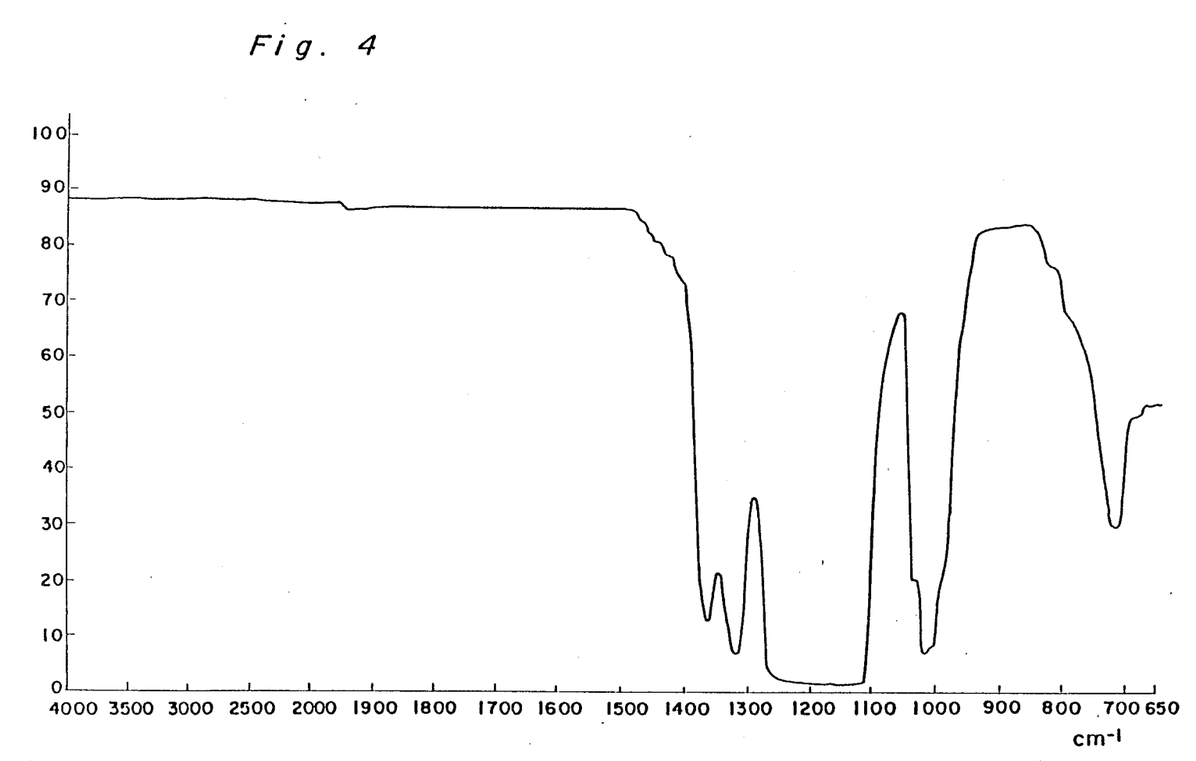

FIGS. 2 to 4 show change of IR spectrum of the product during the above reactions. FIG. 2 is that after 2 hours from the initiation of the photofluorination, FIG. 3 is that after termination of fluorination and FIG. 4 is that after decarbonyl reaction.

By these analyses, the thus obtained oily product was identified as a mixture of the compounds of the formula:

$$F(CF_2CF_2CF_2CF_2O)_nCF_2CF_3$$

wherein the average of n is 23. The value of n was calculated from the integrated value of NMR analysis.

EXAMPLE 15

In the same reactor as used in Example 14, 6.9 g of a mixture of the compounds of the formula:

$$C_3F_7OCFCF_2O(CH_2CF_2CF_2O)_nCH_2CF_3$$
$$|$$
$$CF_3$$

wherein the average of n is 7 and radiated by a low pressure mercury lamp (wavelength: 184.9–546.1 nm) from a distance of 5 cm with stirring in a stream of a gaseous mixture of fluorine and nitrogen in a volume ratio of 20 to 80 at a flow rate of 50 ml/min After 19 hours, the reactor interior was replaced with nitrogen to obtain 7.0 g of the product, which was identified as a mixture (7.0 g) of the compounds of the formula:

$$C_3F_7OCFCF_2O(CH_2CF_2CF_2O)_n(CHFCF_2CF_2O)_mCHFCF_3$$
$$|$$
$$CF_3$$

wherein the average of the sum of m and n is 7 and the ratio of m to n is 1 to 4.

EXAMPLE 16

In the same reactor as used in Example 14, 2.6 g of a mixture of the compounds of the formula:

$$C_3F_7OCFCF_2O(CH_2CF_2CF_2O)_nCH_2CF_3$$
$$|$$
$$CF_3$$

wherein the average of n is 7 and radiated by a high pressure mercury lamp with stirring in a stream of a gaseous mixture of fluorine and nitrogen in a volume ratio of 20 to 80 at a flow rate of 50 ml/min.

After 11 hours, the reactor interior was replaced with nitrogen to obtain 3.3 g of the liquid product, which was identified as a mixture of the compounds of the formula:

$$C_3F_7OCFCF_2O(CF_2CF_2CF_2O)_nCF_2CF_3$$
$$|$$
$$CF_3$$

wherein the average of n is 7.

EXAMPLE 17

In a 100 ml photoreactor equipped with a stainless steel condenser and having a upper window (diameter 30 mm) laminated with a polychlorotrifluoroethylene (hereinafter referred to as PCTFE) film, 10.0 g of the liquid compound of the formula:

$$F(CH_2CF_2CF_2O)_2CH_2CF_2COF$$

was charged, cooled in a water bath and then radiated by a high pressure mercury lamp with stirring in a stream of a gaseous mixture of fluorine and nitrogen in a volume ratio of 20 to 80 at a flow rate of 50 ml/min. The condenser was cooled with dry ice. After 15 hours, the reactor was replaced with nitrogen, and the reaction mixture was subjected to fractional distillation to obtain 9.8 g of the compound of the formula:

$$F(CF_2CF_2CF_2O)_2CF_2CF_3.$$

EXAMPLE 18

In the same manner as in Example 17 but laminating the window with ethylene/tetrafluoroethylene copolymer (hereinafter referred to as "ETFE") instead of PCTFE, fluorination was carried out to obtain the same compound in an 80 % yield.

EXAMPLE 19

In the same manner as in Example 17 but laminating the window with polyvinylidene fluoride instead of PCTFE, fluorination was carried out to obtain the same compound in a 28 % yield.

EXAMPLE 20

In a reactor having a window made of single crystal sapphire, 130.0 g of the polymer of the formula:

$$F(CH_2CF_2CF_2O)_nCH_2CF_2COF$$

wherein the average of n is 22 was charged and liquidized in a stream of nitrogen by circulating a heating medium kept at 80° C. through a jacket around the reactor.

The polymer was radiated through the window by a high pressure mercury lamp (wavelength: 312.5–577 nm) from a distance of 5 cm with stirring in a stream of a gaseous mixture of fluorine and nitrogen in a volume ratio of 50 to 50 at a flow rate of 200 ml/min. The temperature of the reactor interior was kept in a range between 100° and 120° C. by controlling the temperature of the heating medium.

After 50 hours, the supply of fluorine was terminated and only nitrogen was injected at a rate of 100 ml/min. for 24 hours with radiation to obtain 158 g of the compound of the formula:

$$F(CF_2CF_2CF_2O)_nCF_2CF_3$$

which was oil at a room temperature.

EXAMPLE 21

In a photoreactor having a diameter of 30 cm and a window made of quartz laminated with a PFA film, 1.5 Kg of the polymer of the formula:

$$F(CH_2CF_2CF_2O)_nCH_2CF_2COF$$

wherein the average of n is 25 was charged and heated to 100° C. in a stream of nitrogen on an oil bath.

Then, the polymer was radiated through the window by a high pressure mercury lamp from a distance of 5 cm with stirring in a stream of a gaseous mixture of fluorine and nitrogen each at a flow rate of 1 liter/min. The temperature of the reactor interior was kept at a temperature not higher than 120° C. by controlling the temperature of the oil bath.

After 100 hours, the supply of fluorine was terminated and only nitrogen was injected for 50 hours at a rate of 2 liters/min. with radiation. After cooled to a room temperature, 1.8 Kg of the oily compound of the formula:

$$F(CF_2CF_2CF_2O)_nCF_2CF_3.$$

The thus produced product was rectificated under a reduced pressure of 0.05 Torr. and 1.2 Kg of a fraction distilled in a temperature range between 180 and 220° C were recovered. Kinematic viscosity at 40° C of the compound was 65 cst.

EXAMPLE 22

After connecting a rotary pump and a testing plasma producer in which a mixture of carbon tetrafluoride, oxygen and hydrogen was used, the pump was vigorously washed with a solvent and filled with the oil obtained in Example 21. Then, the plasma producer run. After 30 days, no current irregularity was found in the motor.

The viscosity of the oil was 65 cst at 40° C., which was the same as that of the fresh oil. The results of IR and NMR analysis were substantially the same as before use.

EXAMPLE 23

In a 100 ml silica tube equipped with a rotor flow valve, 1.76 g of the polyfluoroether of the formula:

$F(CH_2CF_2CF_2O)_nCH_2CF_3$ wherein the average of n is 5 and 0.55 g of chlorine were charged and radiated by a high pressure mercury lamp for 15 hours. After evacuating the tube, 2.00 g of the oily product was obtained, which was identified as the compound having repeating units of the formula:

$-(CH_2CF_2CF_2O)_x-(CHClCF_2CF_2O)_y-$.

EXAMPLE 24

In a 100 ml silica reactor equipped with an inlet tube, 35.0 g of the polyfluoroether of the formula:

$F(CH_2CF_2CF_2O)_nCH_2CF_3$ wherein the average of n is 5 was charged and radiated by a high pressure mercury lamp with injecting chlorine gas through the inlet tube at a rate of 50 ml/min. After 6 hours, a part of the polymer was removed and analyzed by GLC, IR and NMR to find that the polymer predominantly consisted of the compound of the formula:

$F(CHClCF_2CF_2O)_nCHClCF_3$.

Chlorination was further continued for 14 hours under the same condition as above to obtain 52.1 g of the final product, which was identified as the compound of the formula:

$F(CCl_2CF_2CF_2O)_nCCl_2CF_3$ wherein the average of n is 5.

EXAMPLE 25

In a 100 ml Pyrex glass flask, 50.0 g of the white powdery polyfluoroether of the formula:

$F(CH_2CF_2CF_2O)_nCH_2CF_2COOH$ wherein the average of n is 25 was charged and heated to a temperature range between 100° and 150° C. on an oil bath Then, the ether was radiated by a high pressure mercury lamp with injecting chlorine gas at a rate of 100 ml/min. After 1 week, the flask interior was replaced with nitrogen and cooled to obtain 75.0 g of the compound of the formula:

$F(CCl_2CF_2CF_2O)_nCCl_2CF_2Cl$.

Figure 5:
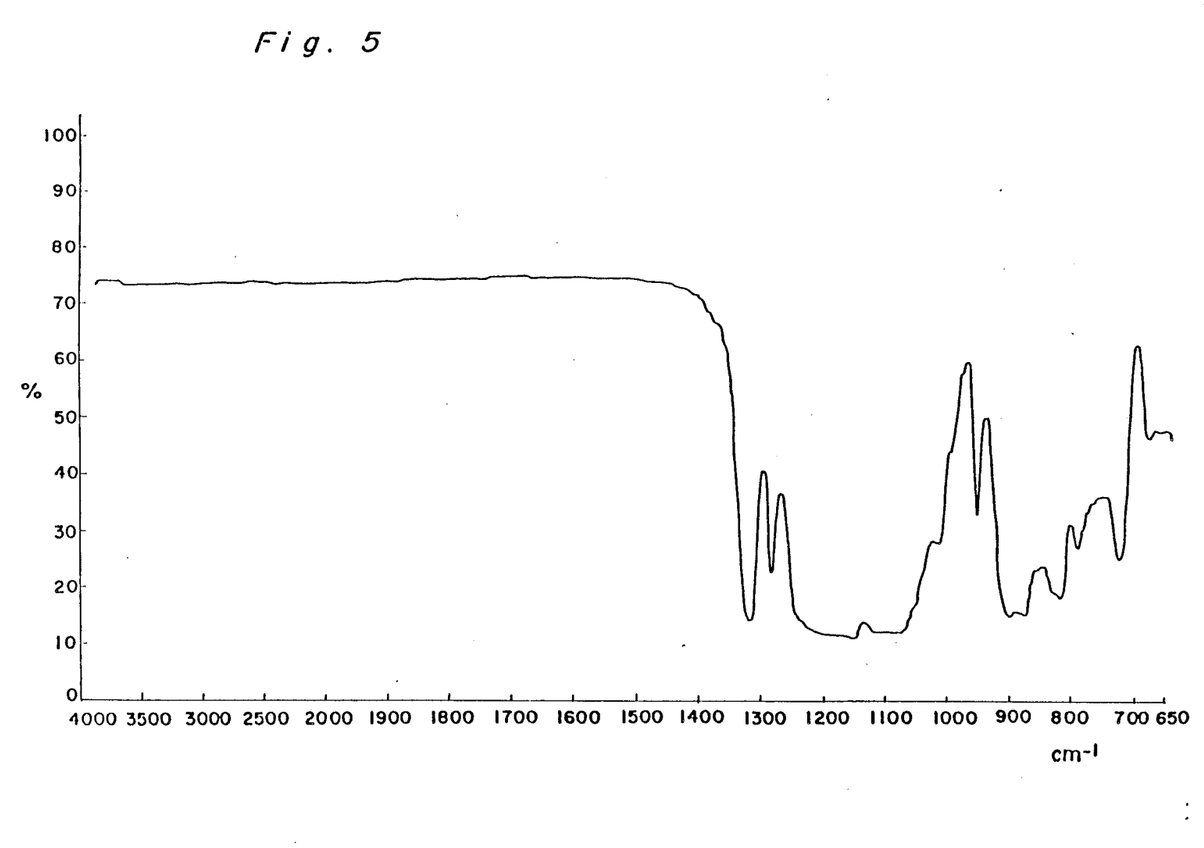
FIG. 5 is an IR spectrum of the compound obtained in Example 25.

IR spectrum of the compound is shown in FIG. 5.

EXAMPLE 26

In a 100 ml Pyrex glass flask equipped with a condenser and an inlet tube, 50.0 g of the liquid compound of the formula:

$CH_2FCF_2CF_2OCH_2CF_2CF_2OCH_2CF_3$ was charged and radiated with stirring by a high pressure mercury lamp with injecting chlorine gas at a rate of 100 ml/min. The temperature of the interior was raised to 90° C. by heat generated by the lamp. After 24 hours, the flask interior was replaced with nitrogen to obtain 72.0 g of the compound of the formula:

$CCl_2FCF_2CF_2OCCl_2CF_2CF_2O_nCCl_2CF_3$.

Figure 6:
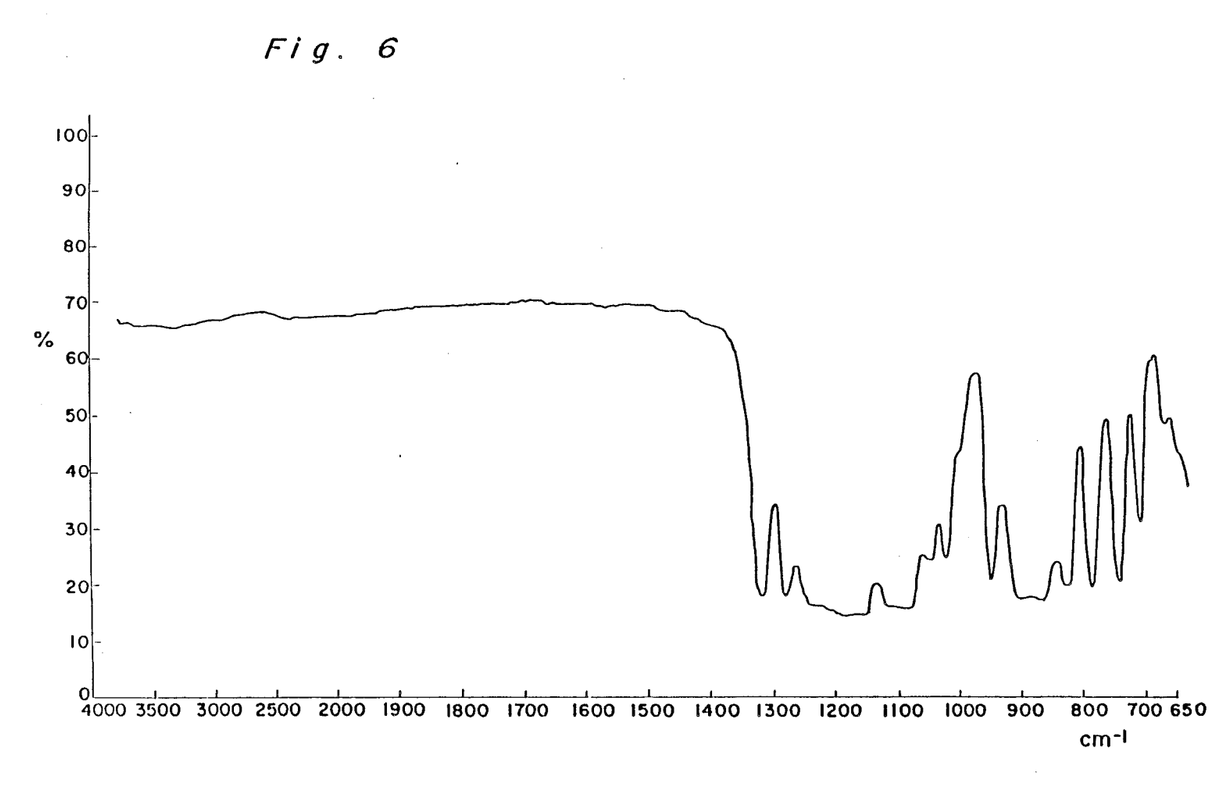
FIG. 6 is an IR spectrum of the compound obtained in Example 26.

IR spectrum of the compound is shown in FIG. 6.

EXAMPLE 27

In the same flask as used in Example 26, 50.0 g of the polyfluoroether of the formula:

$F(CH_2CF_2CF_2O)_nCH_2CF_3$ wherein the average of n is 5 was charged. Then, chlorine gas was injected at a rate of 50 ml/min. for 3 hours. The chlorination rate of the product was 20 %. 10 g of the thus chlorinated product was charged in a stainless steel reactor. A gaseous mixture of fluorine and nitrogen in a volume ratio of 70 to 30 was injected at a rate of 50 ml/min. for 12 hours to obtain the compound of the formula:

$F(CCl_xF_yCF_2CF_2O)_nCCl_xF_yCF_3$ wherein n is the same as defined above and the ratio of x to y is 1 to 4.

EXAMPLE 28

In a 20 liter stainless steel reactor equipped with an agitator and kept at 100° C., 10 Kg of the polyfluoroether of the formula:

$F(CH_2CF_2CF_2O)_nCH_2CF_3$ wherein the average of n is 20 was charged and fluorine gas was injected at a rate of 5 liters/min. for 40 hours. Thereafter, the reactor interior was replaced with nitrogen to obtain 12 Kg of the polyether of the formula:

$F(CF_2CF_2CF_2O)_x-(CHFCF_2CF_2O)_yCF_2CF_2COF$ wherein the ratio of x to y is 2 to 1.

The thus produced polyether was charged in a 20 liter Pyrex glass reactor kept at 100° C. and radiated by a mercury lamp (1 KW) with injecting chlorine gas at a rate of 5 liters/min. for 48 hours to obtain 12.5 Kg of the polyhaloether of the formula:

$$F(CF_2CF_2CF_2O)_x-(CClFCF_2CF_2O)_y-CF_2CF_2COF$$

wherein x and y are the same as defined above.

The thus produced polyhaloether was charged in the same stainless steel reactor as used in the above fluorination and agitated together with 100 g of water. Then, it was heated to 150° C., and fluorine gas was injected at a rate of 2 liters/min. for 12 hours. Then, the reaction interior was replaced with nitrogen to obtain 12.0 Kg of the polyether of the formula:

$$F(CF_2CF_2CF_2O)_x-(CClFCF_2CF_2O)_y-CF_2CF_3$$

wherein x and y are the same as defined above.

Figure 7:
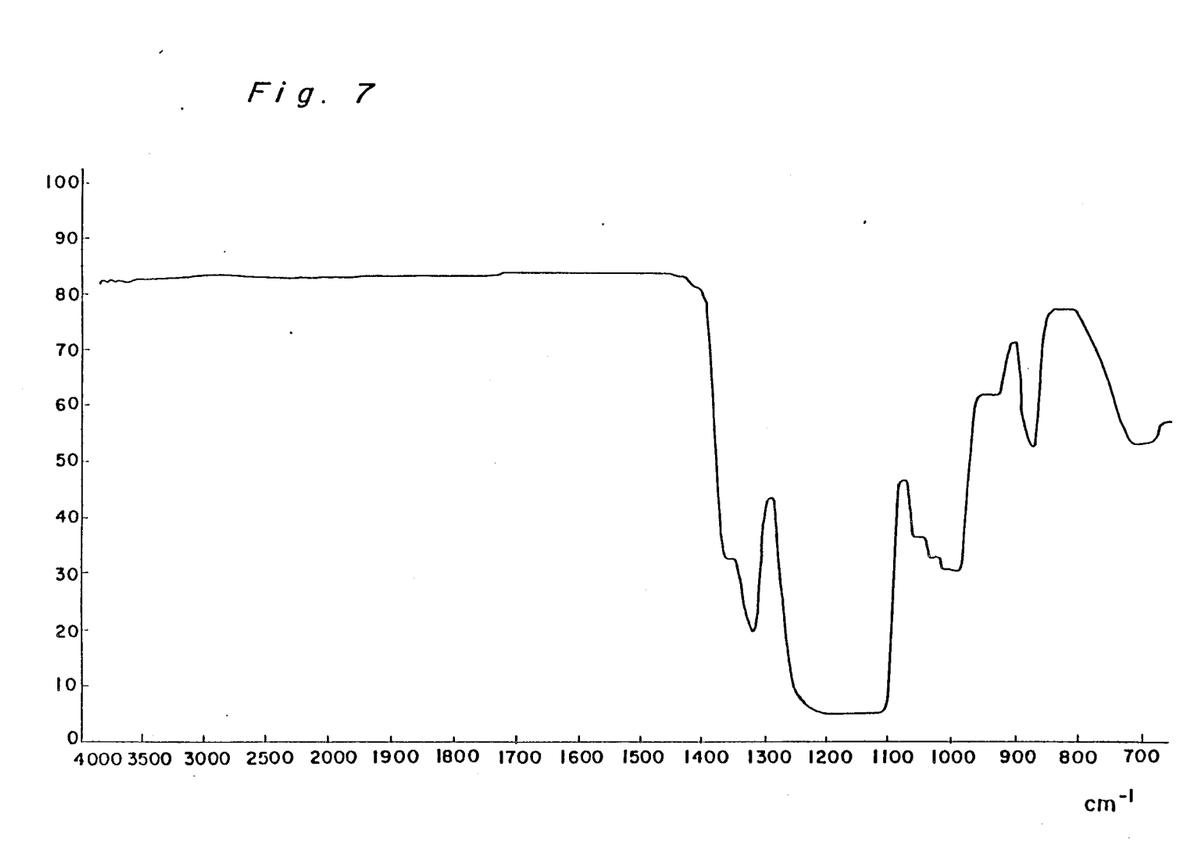
FIG. 7 is an IR spectrum of the compound obtained in Example 28.

IR spectrum of the product is shown in FIG. 7.

EXAMPLE 29

After connecting a rotary pump and a testing plasma producer in which a mixture of carbon tetrafluoride, oxygen and hydrogen was used, the pump was vigorously washed with a solvent and filled with the oil obtained in Example 28. Then, the plasma producer run. After 30 days, no current irregularity was found in the motor.

The viscosity of the oil was 85 cst at 40° C., which was substantially the same as that of the fresh oil (83 cst). The results of IR and NMR analysis were substantially the same as before use.

What is claimed is:

1. A process for preparing a halogencontaining polyether comprising repeating units of the formula:

$$-(CH_2CF_2CF_2O)_a-$$
$$-(CHClCF_2CF_2O)_b-(CCl_2CF_2CF_2O)_c-$$
$$(CHFCF_2CF_2O)_d-(CFClCF_2CF_2O)_e-(CF_2CF_2CF_2O)_f- \quad (I)$$

wherein a, b, c, d, e and f are each an integer not less than 0 and satisfy the following equations:

$$2 \leq a+b+c+d+e+f \leq 200$$

and $$1 \leq a+c+d+f,$$

comprising a ring-opening polymerizing of 2,2,3,3, tetrafluorooxetane in an aprotic solvent in the presence of an alkali metal halide polymerization initiator to give a polyether comprising repeating units of the formula:

$$-(CH_2CF_2CF_2O)_a- \quad (II)$$

wherein a is the same as defined above, and optionally fluorinating and/or chlorinating the polyether (II).

2. The process according to claim 1, wherein the ring-opening polymerization in the aprotic solvent is in the presence of an alkali metal fluoride and additionally an acyl fluoride which reacts with the alkali metal fluoride to generate alkoxy anion.

3. The process according to claim 1, wherein the aprotic solvent is a polyethylene glycol dimethyl ether of the formula:

$$CH_3O(CH_2CH_2O)_nCH_3$$

wherein n is an integer of 2 to 4.

4. The process according to claim 2, wherein the aprotic solvent is a polyethylene glycol dimethyl ether of the formula:

$$CH_3O(CH_2CH_2O)_nCH_3$$

wherein n is an integer of 2 to 4.

5. The process according to claim 1, wherein the ring-opening polymerization in the aprotic solvent is additionally carried out in the presence of a large cyclic polyether as a polymerization accelerator.

6. The process according to claim 5, wherein the aprotic solvent is selected from the group consisting of acetonitrile and a polyethylene glycol dimethyl ether of the formula:

$$CH_3O(CH_2CH_2O)_mCH_3$$

wherein m is an integer of 1 to 4.

7. A process for preparing a fluorine-containing polyether comprising repeating units of the formula:

$$-(CH_2CF_2CF_2O)_a-(CHFCF_2CF_2O)_d-(CF_2CF_2CF_2O)_f- \quad (III)$$

wherein a, d and f are each an integer not less than 0 and satisfy the following equations:

$$2 \leq a+d+f \leq 200,$$

and $$1 \leq d+f,$$

which process comprises fluorinating a fluorine-containing polyether comprising repeating units of the formula:

$$-(CH_2CF_2CF_2O)_a- \quad (II)$$

wherein a is the same as defined above.

8. The process according to claim 7, wherein the fluorinating is carried out with fluorine gas.

9. A process for preparing a fluorine-chlorine-containing polyether comprising repeating units of the formula:

$$-(CH_2CF_2CF_2O)_a-$$
$$-(CHClCF_2CF_2O)_b-(CCl_2CF_2CF_2O)_c-(CHFCF_2CF_2O)_d-(CFClCF_2CF_2O)_e-(CF_2CF_2CF_2O)_f- \quad (IV)$$

wherein a, b, c, d, e, and f are each an integer not less than 0 and satisfy the following equations:

$$2 \leq a+b+c+d+e+f+200,$$

$$1 \leq a+c+d+f$$

and $$1 \leq b+c+e,$$

which comprises fluorinating and chlorinating a fluorine-containing polyether comprising repeating units of the formula:

$$-(CH_2CF_2CF_2O)_a- \quad (II)$$

wherein a is the same as defined above.

10. The process according to claim 9, wherein the chlorinating is carried out with chlorine gas and the fluorinating is carried out with fluorine gas.

11. The process according to claim 9, wherein the chlorinating is carried out with radiation of light having a wavelength of from 200 to 500 nm.

12. A process for preparing a halogen-containing polyether comprising repeating units of the formula:

$$-(CH_2CF_2CF_2O)_a-(CHClCF_2CF_2O)-{}_b-(CCl_2CF_2CF_2O)_c(CHFCF_2CF_2O)hd\ d-(CFClCF_2CF_2O)_e13\ (CF_2CF_2CF_2)_f- \quad (I)$$

wherein a, b, c, d, e, and f are each an integer not less than 0 and satisfy the following equations:

$$2 \leq a+b+c+d+e+f \leq 200$$

and $$1 \leq a+c+d+f,$$

comprising a ring-opening polymerizing of 2,2,3,3 tetrafluorooxetane at a temperature of $-30$ to $+100°$ C. in the presence of a strong Lewis acid and optionally a solvent to give a polyether comprising repeating units of the formula:

$$-(CH_2CF_2CF_2O)_a- \quad (II)$$

wherein a is the same as defined above, and optionally fluorinating and/or chlorinating the polyether (II).

13. The process according to claim 12, wherein the solvent is present and is a dimer or trimer of hexafluoropropylene.

14. The process according to claim 12, wherein the storing Lewis acid is antimony pentafluoride.

15. The process according to claim 12, wherein the solvent is present and is a dimer or trimer of hexafluoropropylene, and the strong Lewis acid is antimony pentafluoride.

16. The process of claim 1, wherein the ring opening polymerization of 2,2,3,3-tetrafluorooxetane is carried out at a temperature of $-30°$ to $100°$ C.

17. The process of claim 1, wherein the ring opening polymerization of 2,2,3,3-tetrafluorooxetane is carried out at a temperature of $-30$ to $+50°$ C.

18. The process according to claim 1, wherein the alkali metal halide polymerization initiator is present in an amount of 0.001% to 30% by mole, based on the amount of 2,2,3,3-tetrafluorooxethane present.

19. The process according to claim 8, wherein fluorinating is carried out at a temperature of 160° to 300° C.

20. The process according to claim 8, wherein fluorinating is carried out at a temperature of 180° to 250° C.

21. The process of claim 10, wherein the fluorinating is carried out at a temperature of 160° to 300° C.

22. The process of claim 10, wherein the chlorinating is carried out at a temperature of 30° to 200° C.

23. The process of claim 11, wherein the chlorinating is carried out at a temperature of 30° to 200° C.

24. A process for preparing a halogen-containing polyether comprising repeating units of the formula:

$$-(CH_2CF_2CF_2O)_a-\\-(CHClCF_2CF_2O)_b-(CCl_2CF_2CF_2O)-{}_c-(CHFCF_2CF_2O)_d-(CFClCF_2CF_2O)_e-(CF_2CF_2CF_2O)_f- \quad (I)$$

wherein a, b, c, d, e, and f are each an integer not less than 0 and satisfy the following equations:

$$2 \leq a+b+c+d+e+f \leq 200$$

and $$1 \leq a+c+d+f,$$

the process comprising: the ring-opening polymerizing of 2,2,3,3-tetrafluorooxetane in the presence of a polyethylene glycol dimethyl ether solvent of the formula:

$$CH_3O(CH_2CH_2O)_nCH_3$$

wherein n is an integer of 2 to 4, and in the presence of 0.001 to 30% by mole, based on the amount of 2,2,3,3-tetrafluorooxetane present, of an alkali metal halide polymerizing initiator, and at a temperature of $-30°$ to $100°$ C.; to give a polyether comprising a repeating unit(s) of the formula:

$$-(CH_2CF_2CF_2O)_a- \quad (II)$$

wherein a is the same as defined above, and thereafter fluorinating and/or chlorinating the polyether repeating unit(s) of Formula II, by fluorinating with fluorine gas at a temperature of 160° to 300° C., and chlorinating with chlorine gas at a temperature of 30° to 200° C. in the presence of radiation from a light having a wavelength of from 200 to 500 nm.

25. The process of claim 24, wherein said repeating unit(s) of Formula II are fluorinated, as optionally provided for, to give a fluorine containing polyether comprising repeating unit(s) of the formula:

$$-(CH_2CF_2CF_2O)_a-(CHFCF_2CF_2O)-{}_d-(CF_2CF_2CF_2O)_f- \quad (III)$$

wherein a, d and f satisfy the requirement of claim 24, and the equation $1 \leq d+f$.

26. The process of claim 24, wherein said repeating unit(s) of Formula II are both fluorinated and chlorinated, as optionally provided for in claim 24, to give a fluorine/chlorine-containing polyether of the formula:

$$-(CH_2CF_2CF_2O)_a-\\-(CHClCF_2CF_2O)_b-(CCl_2CF_2CF_2O)-{}_c-(CHFCF_2CF_2O)_d-(CFClCF_2CF_2O)_e-(CF_2CF_2CF_2O)_f- \quad (IV)$$

wherein a, b, c, d, e, and f satisfy the requirements in claim 24, and the equation $1 \leq b+c+e$.

27. A process for preparing a halogen-containing polyether comprising repeating units of the formula:

$$-(CH_2CF_2CF_2O)_a-\\-(CHClCF_2CF_2O)_b-(CCl_2CF_2CF_2O)-{}_c-(CHFCF_2CF_2O)_d-(CFClCF_2CF_2O)_e-(CF_2CF_2CF_2O)_f- \quad (I)$$

wherein a, b, c, d, e, and f are each an integer not less than 0 and satisfy the following equations:

$$2 \leq a+b+c+d+e+f \leq 200$$

and $$1 \leq a+c+d+f,$$

the process comprising: the ring-opening polymerizing of 2,2,3,3-tetrafluorooxetane in the presence of a polyethylene glycol dimethyl ether solvent of the formula:

$$CH_3O(CH_2CH_2O)_nCH_3$$

wherein n is an integer of 2 to 4, and in the presence of 0.001 to 30% by mole, based on the amount of 2,2,3,3-tetrafluorooxetane present, of an alkali metal halide polymerizing initiator, and at a temperature of $-30°$ to 100° C., to give a polyether comprising a repeating unit(s) of the formula:

$$-(CH_2CF_2CF_2O)_a- \qquad (II)$$

wherein a is the same as defined above.

* * * * *